A. E. AKER.
DUST CAP FOR TIRE VALVES.
APPLICATION FILED NOV. 24, 1917.
1,270,253.
Patented June 25, 1918.
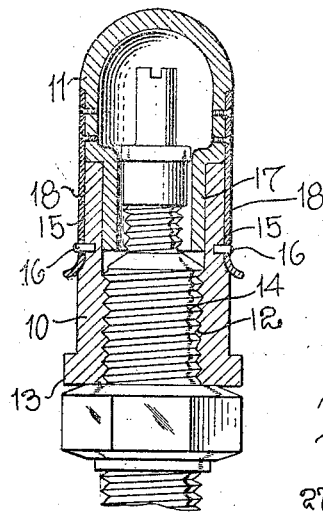
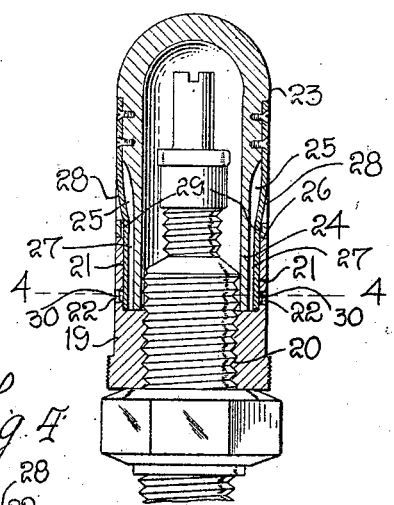
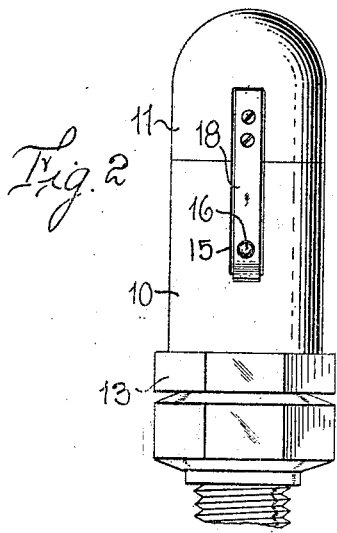
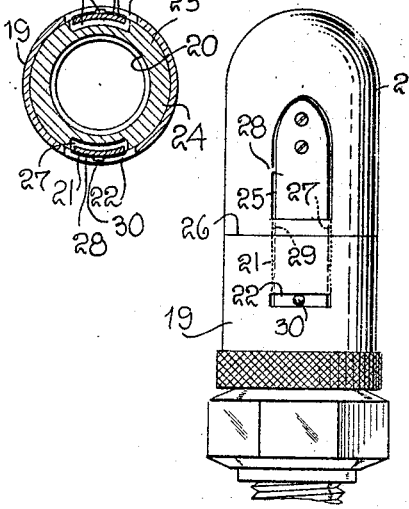
Inventor
A. E. AKER
By Watson E. Coleman
Attorney

UNITED STATES PATENT OFFICE.

ALBERT E. AKER, OF ELDORADO, KANSAS.

DUST-CAP FOR TIRE-VALVES.

1,270,253.   Specification of Letters Patent.   Patented June 25, 1918.

Application filed November 24, 1917. Serial No. 203,750.

*To all whom it may concern:*

Be it known that I, ALBERT E. AKER, a citizen of the United States, residing at Eldorado, in the county of Butler and State of Kansas, have invented certain new and useful Improvements in Dust-Caps for Tire-Valves, of which the following is a specification, reference being had to the accompanying drawings.

This invention relates to valves for pneumatic tires, and particularly to a dust cap therefor. With the ordinary inflation valve used on pneumatic tires, a great deal of time is lost by the motorist in removing the screw-threaded dust cap from the body of the valve, as this cap often becomes stuck or bound so that it is necessary to use an implement for removing the cap and replacing it.

The general object of my invention is the provision of a dust cap which may be readily removed, without the necessity of using any implement for the purpose, and which will lock into place.

A further object is to provide a dust cap formed in two sections adapted to be engaged with the ordinary tire body, the upper section of the cap being detachably engaged with the other or base section so that it may be readily removed.

A further object is to provide a device of this character which is very simple in construction, may be cheaply made and which may be applied to practically all forms of tire valves.

Other objects will appear in the course of the following description.

My invention is illustrated in the accompanying drawings, wherein:—

Figure 1 is a vertical sectional view of one form of my improved dust cap;

Fig. 2 is an elevation of the form illustrated in Fig. 1;

Fig. 3 is a vertical sectional view of another form of dust cap;

Fig. 4 is a transverse section on the line 4—4 of Fig. 3; and

Fig. 5 is an elevation of the dust cap shown in Fig. 3.

Referring to Figs. 1 and 2, it will be seen that my improved dust cap is formed in two sections, a base section 10 and a cap or cover section 11, preferably formed of hard fiber. The base section 10 is interiorly screw-threaded as at 12 to engage with the usual screw-threaded wall of a tire valve, this base section being preferably formed with a many-sided head 13 whereby it may be engaged by a wrench and so screwed down tightly upon the screw-threaded body 14 of the valve. The outer portion of the base section 10 is formed with a plurality of longitudinally extending grooves 15 and projecting from the bottoms of these grooves are the radially extending pins 16.

The outer section or cap 11 previously referred to fits snugly upon the upper portion of the base section, the lower portion of the cap being reduced in exterior diameter, as at 17, to fit within said base section so that the outer face of the cap section is flush with the outer face of said base section.

Attached to the exterior face of the cap in any suitable manner are a plurality of resilient tongues 18, each formed with a perforation adjacent its lower end, the lower ends of the tongues being bent outward. The perforations in these tongues are adapted to engage with the pins 16 when the cap section 11 is disposed upon the base section and this engagement holds the cap section 11 upon the base section. When it is desired to remove the cap section 11 so as to disclose the valve, the tongues may be pulled away from their engagement with the pin 16 and then the cap section may be easily removed.

Preferably there are two of these tongues 18 diametrically opposite each other and the base section is formed with two grooves 15 for the guidance of these tongues. Thus when it is desired to remove the cap it is only necessary to insert the thumb nail beneath one of the tongues and the finger only of the other hand beneath the other tongue to spread the tongues apart and then the cap may be readily removed. In placing the cap on the base section, it is only necessary to force the cap inward when the tongues will spring over the pins 16.

It is to be understood that a dust cap consisting of the two sections 10 and 11 is intended to take the place of the ordinary one piece dust cap and to screw on the valve body, the section 10 to remain upon the valve body, while the section 11 may be removed and replaced without affecting the section 10.

In Fig. 3 I have shown another form of my invention and which form I regard as preferable. In this construction 19 designates the base section, which is interiorly screw-threaded as at 20 to engage with the valve body and which has its exterior face roughened so that a pair of pliers may be engaged with the base to unscrew it. At intervals around the outer end of the base there are formed inwardly extending recesses 21 and slots 22 which extend circumferentially and open into said recesses from the exterior face of the base. The cap section 23 is reduced at its lower end as at 24 to fit into the section 19 and the exterior face of the cap section is provided at diametrically opposite points with downwardly extending recesses 25. These recesses extend nearly to the shoulder 26 formed at the upper end of the reduced portion of the cap. The reduced portion of the cap is also longitudinally grooved as at 27 and disposed in the recesses 25 are the outwardly bowed springs 28 which are attached at their upper ends to the wall of the cap section, these springs extending downward and through slots 29 formed in the shoulder 26 below the recesses 25, these springs extending downward into the grooves 27. Each of these springs is provided at its lower end with an outwardly projecting detent 30 in the form of a pin engageable in one of the slots 22.

With this construction when it is desired to place the dust cap section 23 upon the base section 19, the fingers are used to force the springs 28 inward so as to carry the detents 30 inward into position to be inserted in the grooves 21; then the cap is forced downward until these pins 30 spring out into the slots 22. The cap section is thus locked upon the base section. When it is desired to remove the cap section, the springs 28 are compressed thus releasing the pins 30 from the slots 22 and then the cap may be withdrawn. With this construction it is possible to readily withdraw or replace the cap section without the necessity of using both hands.

It will be understood, of course, that in both of these forms of my device the base section is not removed from the valve unless it becomes necessary to change a tire. A device of this kind does away with the necessity of unscrewing the usual cap from the valve stem which, as before stated, usually requires the use of a tool and which often takes considerable time. The device is very simple, may be cheaply made and has been found thoroughly effective in practice.

While I have illustrated particular forms of dust caps, it will be understood that many changes may be made therein without departing from the spirit of the invention as defined in the appended claims.

Having described my invention, what I claim is:—

1. A dust cap for the valves of pneumatic tires comprising a base section and a cap section, the base section being interiorly screw-threaded to engage with the valve stem of a pneumatic tire, one of said sections having a reduced portion over which the other section fits, said base section being formed with longitudinal grooves, and resilient detents mounted upon the cap section, fitting in said grooves, and detachably engaging the base section.

2. A dust cap for the valves of pneumatic tires comprising a base section interiorly screw-threaded to engage the body of the valve and formed with longitudinal grooves on its inside face and circumferential slots opening into said grooves from the outside face, and a cap section reduced at one end to fit within the base section and having resilient tongues mounted upon it and formed with detents, the tongues being adapted to be received in said grooves and the detents in the slots.

3. A dust cap for the valves of pneumatic tires comprising an interiorly screw-threaded base section formed with grooves extending inward from one end, the grooves opening upon the inside face of the base, the base being also formed with circumferentially extending slots opening from the face of the section into said grooves, and a cap section reduced in diameter at one end to fit within the base section, and formed upon its face with longitudinally extending recesses, the reduced portion of the cap section having longitudinally extending grooves disposed below said recesses, and outwardly bowed spring tongues mounted upon the cap section and extending down in said recesses and grooves and formed with outwardly projecting detents adapted to engage in said slots in the base section when the cap section is forced home into the base section.

In testimony whereof I hereunto affix my signature in the presence of two witnesses.

ALBERT E. AKER.

Witnesses:
JOHN C. HOYT,
BESSIE McCLURE.